US008817615B2

(12) United States Patent
Kutscher et al.

(10) Patent No.: US 8,817,615 B2
(45) Date of Patent: Aug. 26, 2014

(54) METHOD FOR OPERATING A WIRELESS NETWORK AND A WIRELESS NETWORK

(75) Inventors: Dirk Kutscher, Heidelberg (DE);
Faisal-Ghias Mir, Heidelberg (DE);
Henrik Lundqvist, Munich (DE)

(73) Assignee: NEC Europe Ltd., Heidelberg (DE)

( * ) Notice: Subject to any disclaimer, the term of this patent is extended or adjusted under 35 U.S.C. 154(b) by 72 days.

(21) Appl. No.: 13/582,757

(22) PCT Filed: Mar. 5, 2010

(86) PCT No.: PCT/EP2010/001387
§ 371 (c)(1),
(2), (4) Date: Sep. 28, 2012

(87) PCT Pub. No.: WO2011/107121
PCT Pub. Date: Sep. 9, 2011

(65) Prior Publication Data
US 2013/0016610 A1    Jan. 17, 2013

(51) Int. Cl.
*H04W 28/02* (2009.01)
*H04W 28/10* (2009.01)
*H04L 12/56* (2006.01)
*H04W 72/12* (2009.01)

(52) U.S. Cl.
CPC ....... *H04L 47/2441* (2013.01); *H04W 72/1221* (2013.01); *H04W 28/10* (2013.01); *H04L 47/14* (2013.01); *H04L 49/90* (2013.01); *H04L 47/30* (2013.01); *H04L 47/11* (2013.01); *H04L 47/10* (2013.01)
USPC ........... 370/230; 370/204; 370/229; 370/412; 455/13.1; 709/232

(58) Field of Classification Search
USPC .................. 370/229, 230–238, 349; 709/232; 455/13.1
See application file for complete search history.

(56) References Cited

U.S. PATENT DOCUMENTS

| 6,590,890 B1 * | 7/2003 | Stolyar et al. ................. 370/349 |
| 6,917,585 B1 * | 7/2005 | Firoiu et al. .................. 370/229 |
| 7,383,349 B2 * | 6/2008 | Lodha ........................... 709/232 |

(Continued)

FOREIGN PATENT DOCUMENTS

| EP | 1 130 872 A1 | 9/2001 |
| EP | 1 317 151 A1 | 6/2003 |
| GB | 2 399 989 A | 9/2004 |
| WO | 2004/002085 A1 | 12/2003 |

(Continued)

OTHER PUBLICATIONS

Yi et al, Proxy-Red: an AQM scheme for wireless local area networks, Oct. 2004.*

(Continued)

*Primary Examiner* — Michael Thier
*Assistant Examiner* — Vincelas Louis
(74) *Attorney, Agent, or Firm* — Young & Thompson

(57) ABSTRACT

For allowing a best possible usage of network resources even under congestion conditions a method for operating a wireless network, especially an IP (Internet Protocol) network, is described, wherein a queue management function based on an average queue length in a network element is used. The method is characterized in that a result of a weighting function will be combined or multiplied with the average queue length for determining a combined congestion contribution for use within the queue management function, wherein the weighting function takes into account per-user information on a wireless channel condition. Further, a corresponding wireless network, preferably for carrying out the above mentioned method, is also described.

11 Claims, 6 Drawing Sheets

(56) References Cited

U.S. PATENT DOCUMENTS

Figure 1:
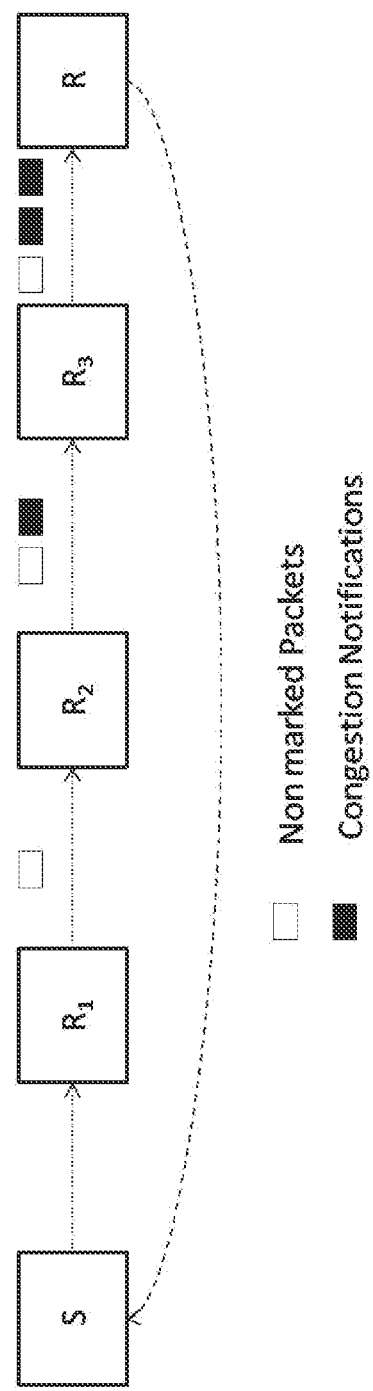

| | | | |
|---|---|---|---|
| 7,936,678 B2* | 5/2011 | Paloheimo et al. | 370/235 |
| 2002/0159388 A1* | 10/2002 | Kikuchi et al. | 370/229 |
| 2003/0112754 A1* | 6/2003 | Ramani et al. | 370/230 |
| 2003/0225903 A1* | 12/2003 | Lodha | 709/232 |
| 2004/0027997 A1 | 2/2004 | Terry et al. | |
| 2004/0071086 A1* | 4/2004 | Haumont et al. | 370/230 |
| 2006/0045011 A1* | 3/2006 | Aghvami et al. | 370/230 |
| 2007/0264932 A1* | 11/2007 | Suh et al. | 455/13.1 |
| 2008/0186918 A1* | 8/2008 | Tinnakornsrisuphap et al. | 370/331 |
| 2009/0067335 A1* | 3/2009 | Pelletier et al. | 370/238 |

FOREIGN PATENT DOCUMENTS

| | | |
|---|---|---|
| WO | 2004/040859 A1 | 5/2004 |
| WO | 2004/047379 A2 | 6/2004 |
| WO | 2009/008817 A1 | 1/2009 |

OTHER PUBLICATIONS

Kutscher et al, Congestion exposure in mobile wirelesss communications, Dec. 2010.*

International Search Report, dated Dec. 2, 2010, from corresponding PCT application.

* cited by examiner

METHOD FOR OPERATING A WIRELESS NETWORK AND A WIRELESS NETWORK

The present invention relates to a method for operating a wireless network, especially an IP (Internet Protocol) network, wherein a queue management function based on an average queue length in a network element is used. Further, the present invention relates to a wireless network, especially an IP (Internet Protocol) network, wherein a queue management function based on an average queue length in a network element is used.

Communication resource management is an important feature in commercial wireless communication networks, because it enables Quality of Service (QoS) provisioning, good network utilization etc. Traditionally, QoS has been a crucial feature to guarantee predictable user experience for fixed bitrate services such as voice communication, which is the reason why reservation of resources, different quality of service classes are used in the UMTS (Universal Mobile Telecommunications System) access network (UTRAN— UMTS Terrestrial Radio Access Network).

Data communication—in most cases: Internet communication—is normally treated as best-effort traffic, i.e., traffic that does not require guaranteed bitrates and strict resource reservation. This is based on the assumption that such traffic would use transport protocols such as TCP (Transmission Control Protocol) that is generally able to adapt to changing path characteristics thanks to its congestion control mechanism.

The original TCP congestion control mechanisms react to implicit congestion notification, i.e., a sender would miss acknowledgments and interpret this as a congestion indication. The general assumption is that in case of network congestion, router queues would exceed their maximum capacity, and routers would be forced to drop packets. This packet loss is implicitly signaled to the TCP sender, because the TCP receiver has not received any packets to acknowledge.

However, the use of packet loss as an implicit way of recognizing congestion events in network has its limitations. For example, wastage of network resources—bandwidth— due to retransmissions in response to packet drop is not desirable and the accuracy of the feedback is limited since packet losses can also occur due to bit errors rather than congestion.

Active Queue Management (AQM) is one important domain for generating congestion signals for the communicating end points more efficiently, see Floyd, S., and Jacobson, V., Random Early Detection gateways for Congestion Avoidance V.1 N.4, August 1993, p. 397-413. The queue management at intermediate routers defines buffer occupancy behavior for arriving packets. Usually AQM captures the notion of congestion in terms of average queue length of a buffer in a network element. Once such an average exceeds some threshold, a congestion signal can be conveyed either by dropping a packet or by marking packets, i.e. by explicitly setting a bit pattern—marking operation—in packets, e.g. IP header, passing through a congested link in the network. The aim is to notify end hosts of incipient congestion so that they can reduce their sending rates before packets are actually dropped.

Random Early Detection (RED) is the most well-known AQM mechanism for notifying congestion signals to end hosts, see Floyd, S., and Jacobson, V., Random Early Detection gateways for Congestion Avoidance V.1 N.4, August 1993, p. 397-413. The RED algorithm detects incipient congestion by maintaining average queue length for a queue in a network element. The parameter is calculated using a low pass filter with exponential weighted moving average on the instantaneous queue length. It ensures that average queue length is not much reactive to occasional traffic bursts: transient congestion. Moreover, RED defines two thresholds: min-threshold and max-threshold. As long as the average queue length remains under min-threshold no packet is marked, since the network element is not congested. As average queue size exceeds min-threshold but remains below the max-threshold, RED algorithm probabilistically marks arriving packets. The marking probability is not fixed but calculated as a function of average queue size. Therefore, the marking probability increases with average queue size moving towards the upper threshold and vice versa. In congestion situations, the increase in marking probability leads to an increased marking rate for arriving packets. Similarly, once average queue size exceeds max-threshold one alternative is to mark every arriving packet. However, it is recommended to gently increase marking probability to 1 for ensuring system stability. Eventually, if the queue overflows RED will start dropping packets.

A particular marking mechanism is Explicit Congestion Notification (ECN), see Ramakrishnan, K., Floyd, S., and D. Black, "The Addition of Explicit Congestion Notification (ECN) to IP", RFC 3168, September 2001. The aim of ECN is to convey persistent congestion signals to end host by explicitly setting bit patterns—marking operation—in packets arriving at a congested network element. ECN relies on end point transport for passing on such notifications to sending host for taking appropriate congestion response. Though not binding, it is expected that in a collaborative network environment sender will reduce its sending rate in response to such notifications. Further, ECN also aims at conserving network bandwidth as far as possible by avoiding retransmissions through packet loss. Moreover, it makes it feasible to distinguish packet drops due to bit errors from drops due to congestion.

ECN itself is a mechanism for marking packets so that the receiver has explicit information about the congestion state in the network. The assumption is that this mechanism would be used together with a transport protocol such as TCP that would be able to signal the observed congestion back to the actual sender so that congestion control algorithms can react accordingly.

The overall operation is depicted in FIG. 1: a TCP sender S is sending TCP packets to a TCP receiver R. Routers along the path—R1, R2, R3—can observe congestion and, depending on their AQM implementation, decide to mark packets. Finally, the receiver R would receive such marked packets and signal this information about TCP's feedback channel back to the original sender S.

Normally there will be several congestion markers on the path, i.e. on each IP router in the ideal case. However, it is not necessary to use ECN marking in every router which makes it easier to deploy ECN gradually, but it would be preferable to use it for all likely bottlenecks in the network. A particular bottleneck in mobile communication networks is the wireless base station, eNB (eNodeB) in LTE (Long Term Evolution), so it would be intuitively beneficial to implement an ECN marking function on the wirelesse base station or eNB.

There are different approaches for marking algorithms in routers. In general, the objective for ECN marking is to provide explicit congestion notifications to senders before congestion becomes really problematic. Given a good algorithm, this approach can avoid router buffers getting congested, which would lead to longer delays and eventually to packet loss.

Figure 2:
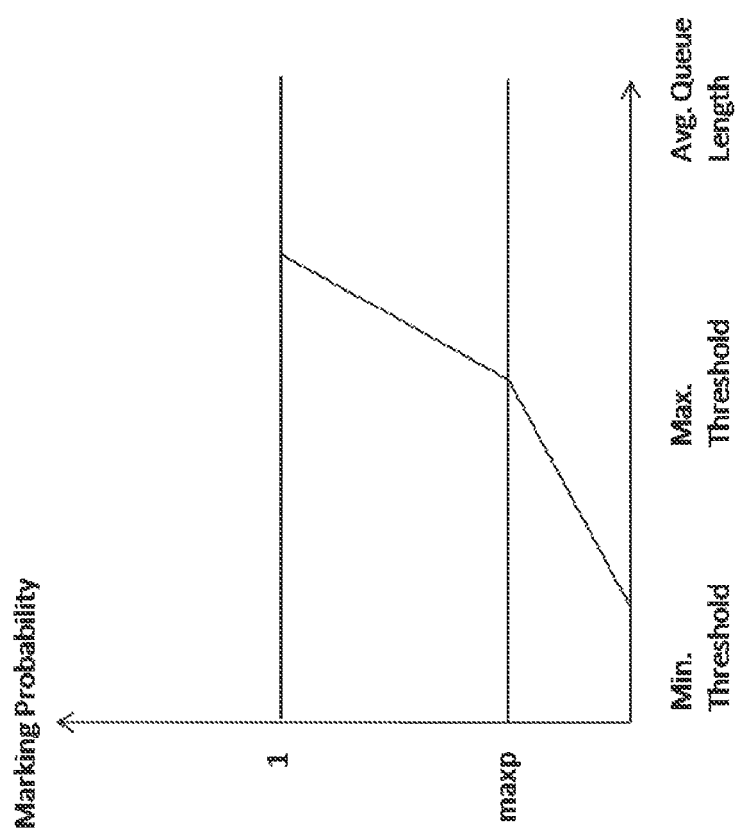

The original RED algorithm uses a marking probability that increases linearly with increasing queue length from a minimum threshold to a maximum threshold. However, it has later been found that this leads to an unstable behavior in some cases, therefore a second marking phase has been added where the slope, or the probability increase, is steeper as depicted in FIG. 2, see V. Rosolen, Bonaventure, O., and G. Leduc, A RED discard strategy for ATM networks and its performance evaluation with TCP/IP traffic, ACM Computer Communication Review, July 1999.

In a wireless environment an important difference from a common wired network router is that the wireless channel conditions vary in time and space. The air interface of LTE and WiMAX (Worldwide Interoperability for Microwave Access) provides adaptable Modulation and Coding Schemes (MCS) to better accommodate variations with respect to available radio resources, attenuation, caused by distance, interference etc., see 3GPP TS 36.211 V9.0.0, Evolved Universal Terrestrial Radio Access (E-UTRA); Physical channels and modulation, Dececkber 2009, 3GPP TS 36.321 V9.1.0, Evolved Universal Terrestrial Radio Access (E-UTRA); Medium Access Control (MAC) protocol specification, January 2010 and IEEE Standard 802.16, Local and Metropolitan Area Networks—Part 16: Air Interface for Broadband Wireless Access Systems, 2009. In general, each user—wireless terminal—can be assigned an individual MCS (Modulation and Coding Scheme) at a time. This means that, based on the actual MCS at a time, transmitting the same bit sequence can require different shares of the overall radio resource.

From EP 1 317 151 A1 is obtainable a method for congestion control in a wireless network that comprises the steps of transmitting data packets to one or more user terminals over a wireless network link and setting one or more explicit congestion (ECN) bits in a sub-set of the transmitted packets prior to a transmission, wherein the proportion of transmitted packets whose ECN bit or bits is set is indicative of a congestion charged to be made for use by the or user terminal of one or more wireless resources.

This is a general claim for using ECN in wireless networks. Within sub-claims, details for obtaining the ECN marking probability are provided, wherein the setting step further comprises the steps of monitoring the data traffic load in the wireless network and re-selecting an ECN setting probability as a function of the monitored data traffic load, wherein the function is arranged such, that the ECN probability increases as the monitor data traffic load increases.

This known approach suggests deriving an ECN marking probability form the traffic load. This is the normal behaviour of ECN-enabled routers as depicted in FIG. 1.

Further, it is suggested to derive the ECN marking probability by using a function to indicate the congestion charge for using the wireless resources.

From US 2009/0067335 A1 is obtainable a method for congestion control in a transmission node, particularly a method of operating a communications network comprising a transceiver configured to transmit a shared radio resource to a user, a packet marker configured, upon detection of congestion of the shared radio resource, to selectively drop packets allocated to the shared radio resource in accordance with the user's share of the shared radio resources. Further, the user's share can be expressed in terms of cost or amount of resources associated to a user. Moreover, the packet marker can be configured to determine the cost, or the amount of resources associated to the user, based on transmitter measurements. Thus, US 2009/0067335 A1 suggests to derive the dropping influence by cost generated by amount of resources associated to the user, which can be based on different transmitter measurements.

Reviewing the current methods for operating a wireless network, there is a problem that current, queue-length-based methods do not provide a satisfying usage of the wireless resource under congestion situations, because a user with sub-optimal wireless channel conditions would need considerably more wireless resources for transmitting/receiving the same number of bits as a user with better wireless channel conditions.

Thus, it is an object of the present invention to improve and further develop a method for operating a wireless network and an according wireless network for allowing a best possible usage of network resources even under congestion conditions.

In accordance with the invention, the aforementioned object is accomplished by a method comprising the features of claim 1 and a network comprising the features of claim 13.

According to claim 1 the method is characterized in that a result of a weighting function will be combined or multiplied with the average queue length for determining a combined congestion contribution for use within the queue management function, wherein the weighting function is taking into account per-user information on a wireless channel condition.

According to claim 13 the wireless network is characterized by means for combining or multiplying a result of a weighting function with the average queue length for determining a combined congestion contribution for use within the queue management function, wherein the weighting function is taking into account per-user information on a wireless channel condition.

According to the invention it has been recognized that the above object is accomplished by taking into account per-user information on a wireless channel condition. Concretely, a result of a weighting function can be combined or multiplied with the average queue length for determining a combined congestion contribution for use within the queue management function. The weighting function is taking into account the above per-user information for giving a high degree of individualization in queue management. The determined congestion contribution can be used for enhancing AQM algorithms in wireless base stations.

Preferably, the per-user information could comprise resource usage and/or transmission cost for transmitting a certain information unit. In other words, the present invention solves the problem that in current wireless infrastructure systems the radio-resource related cost of transmitting a certain information unit is not taken into account for congestion detection and management.

Within a preferred embodiment the weighting function could map channel resource usage to a factor for congestion contribution. The results can be used to control a congestion management action that could depend on a particular Active Queue Management approach.

Such an embodiment could be independent of specific radio air interfaces, i.e., it can be applied to GPRS (General Packet Radio Service), UMTS, LTE, WiMAX and others. The assumption is that a useful weighting function can be found that can map individual users' wireless resource usage to a congestion contribution weight.

Different specific weighting functions could be used for this method. Within one preferred embodiment the weighting function could be based on an MCS (Modulation Coding Scheme).

Preferably, a marking or a dropping probability calculated from the average queue length could be multiplied with an index, which is based on the current MCS of a user. In principal, the index could be inversely proportional to the spectral efficiency of the MCS, i.e. how many bits that are transmitted in one resource block.

Within another preferred embodiment the weighting function could be based on transmission power, preferably for sending from a base station to a wireless station or terminal.

Depending on distance of the terminal from the base station, different transmission power levels can be used. E.g., with increasing distance of a terminal from the base station, both, base station and terminal would use higher transmission power, which can lead to increased interference or power consumption. With the present invention such costs can be considered for the contribution to congestion.

Preferably, a currently used transmission power on a downlink could be mapped to a congestion contribution for packets directed to a corresponding wireless terminal.

Within the weighting function current channel characteristics could reflect a relevant time period, which will be achieved by averaging a specific value representing resource usage over time. Thus, a best possible usage of network resources can be provided even under congestion conditions.

With regard to a suitable implementation of the method the combined congestion contribution could be used for determining a packet drop probability, preferably for RED (Random Early Detection). Alternatively, the combined congestion contribution could be used for determining a congestion marking probability, preferably for ECN (Explicit Congestion Notification). Within a further embodiment, the combined congestion contribution could be used for determining a packet drop probability as well as for determining a congestion marking probability. A combined method with packet drop and packet marking could be useful for allowing a best possible usage of network resources.

Within a concrete embodiment the method could be performed within a wireless base station of the network. However, the implementation within other network elements is possible.

The present invention is providing a concept to take current, per-user information on the wireless channel conditions into account for determining the congestion contribution, and to use this information for enhancing Active Queue Management algorithm in wireless base stations. Further, the consideration of a user's current wireless resource usage for congestion marking is proposed. The invention is providing a simple, yet effective implementation leveraging adaptive MCS and transmission power. Thus, a wireless resource-aware Active Queue Management on LTE base stations is possible.

This invention solves the problem of measuring and managing congestion in wireless networks by taking individual users' current radio channel conditions into account for the congestion detection algorithm. This approach reflects the current wireless resource usage of individual users for determining their current contribution to congestion. Assuming ECN-aware transport protocols, this would lead to a better link utilization and lower average delays caused by congestion on the wireless link.

Congestion marking or early packet dropping—as an implicit notification mechanism—is typically implemented by Active Queue Management (AQM) algorithms as described above, which normally only use the state of a queue as input and do not differentiate between different flows or users. This leads to simple algorithms which require a minimum of state information to be kept. However, for a radio interface, the channel conditions for each user are typically different, and the marking algorithm can be modified to convey this information to the higher layers. This allows the end system to react on the whole path state including both the wireless channel and the congestion in other parts of the network based on a single feedback signal.

Applying AQM and/or ECN to wireless communication itself is not a new topic. However, it is proposed how wireless resource usage and queue length is taken into account to arrive at a marking and/or dropping probability.

The present invention is proposing an enhanced weighted queue management for wireless base stations. Further, the invention describes the possibility of applying different congestion management actions, including ECN marking. Within prior art—EP 1 317 151 A1—only the behaviour of a complete system—including IP senders, receivers and intermediary routers—with a limitation to ECN is considered. Further, the prior art is proposing deriving the ECN marking probability by using a function to indicate the congestion charge for using the wireless resources. This is different from combining router queue length with a weighting function of per-user information on the wireless channel conditions for determining the congestion contribution, and to use this information for enhancing AQM algorithm in wireless base stations.

Figure 5:
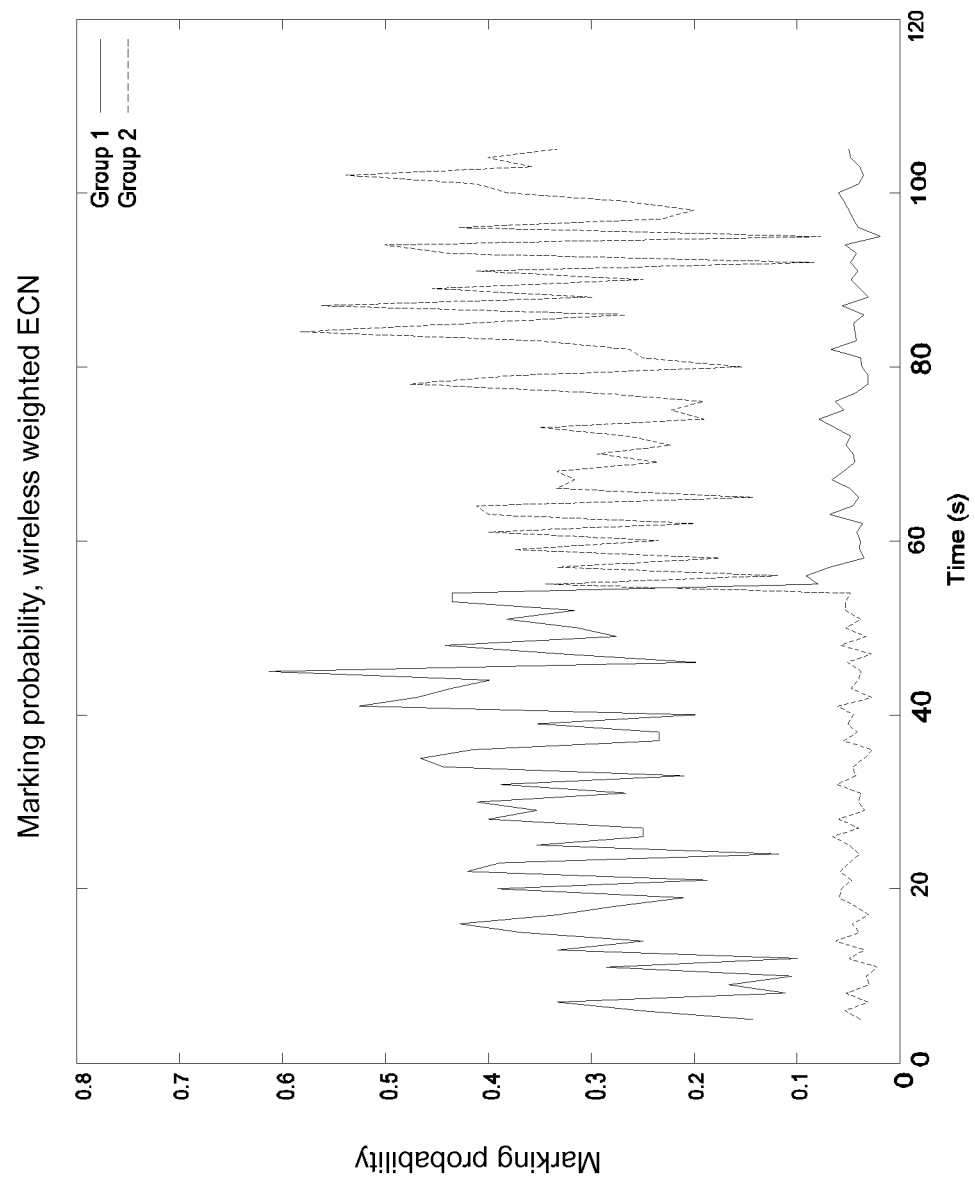
Figure 6:
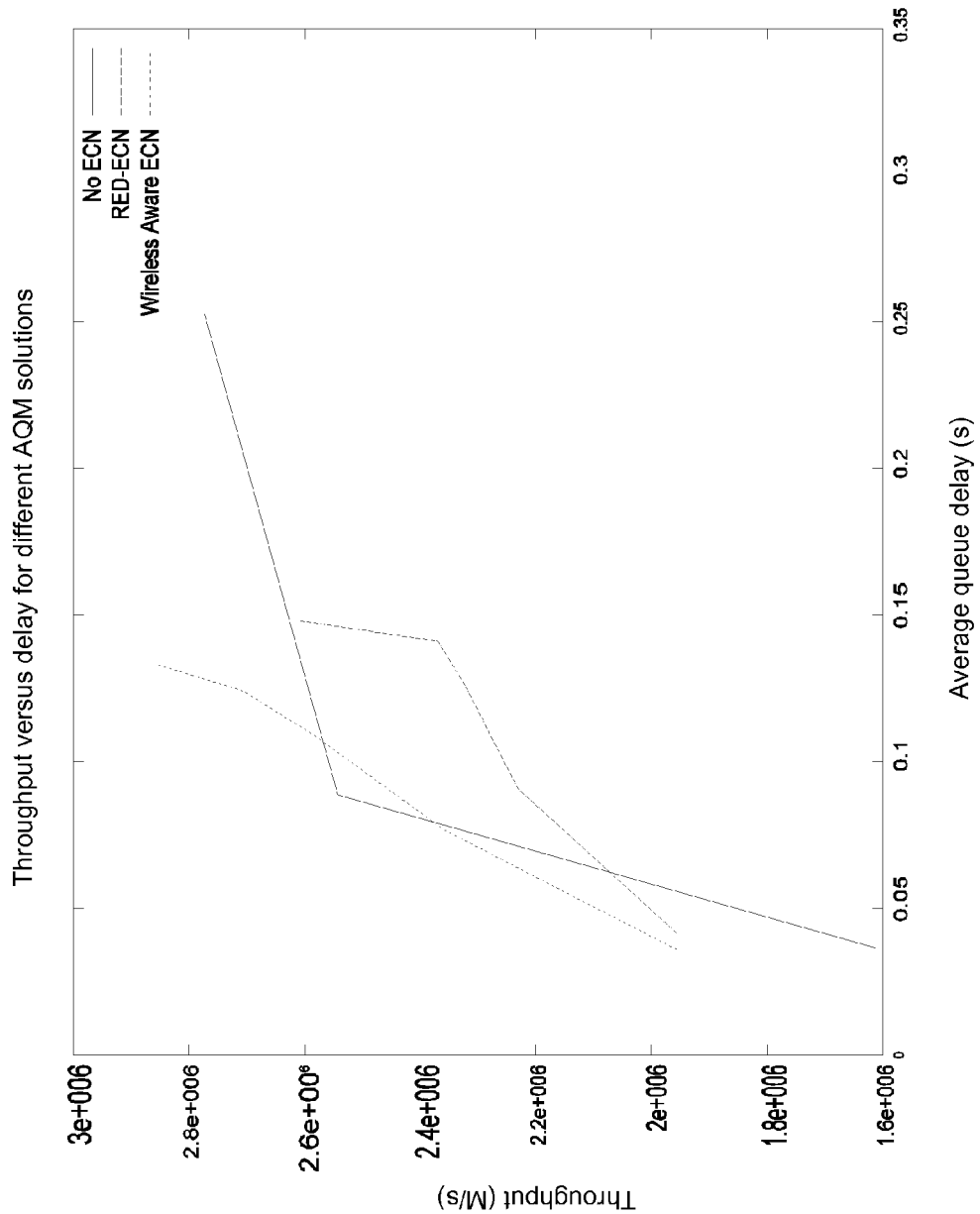

There are several ways how to design and further develop the teaching of the present invention in an advantageous way. To this end, it is to be referred to the patent claims subordinate to patent claim 1 on the one hand and to the following explanation of preferred examples of embodiments of the invention, illustrated by the drawing on the other hand. In connection with the explanation of the preferred examples of embodiments of the invention by the aid of the drawing, generally preferred embodiments and further developments of the teaching will be explained. In the drawing FIG. 1 is illustrating a typical ECN congestion marking method, FIG. 2 is illustrating a typical RED marking algorithm, FIG. 3 is illustrating a wireless resource block allocation for wireless terminals, FIG. 4 is illustrating a preferred embodiment of the method for operating a wireless network according to the invention, FIG. 5 is illustrating a marking rate for wireless weighted marking and FIG. 6 is illustrating the throughput versus delay for different queuing solutions.

Figure 3:
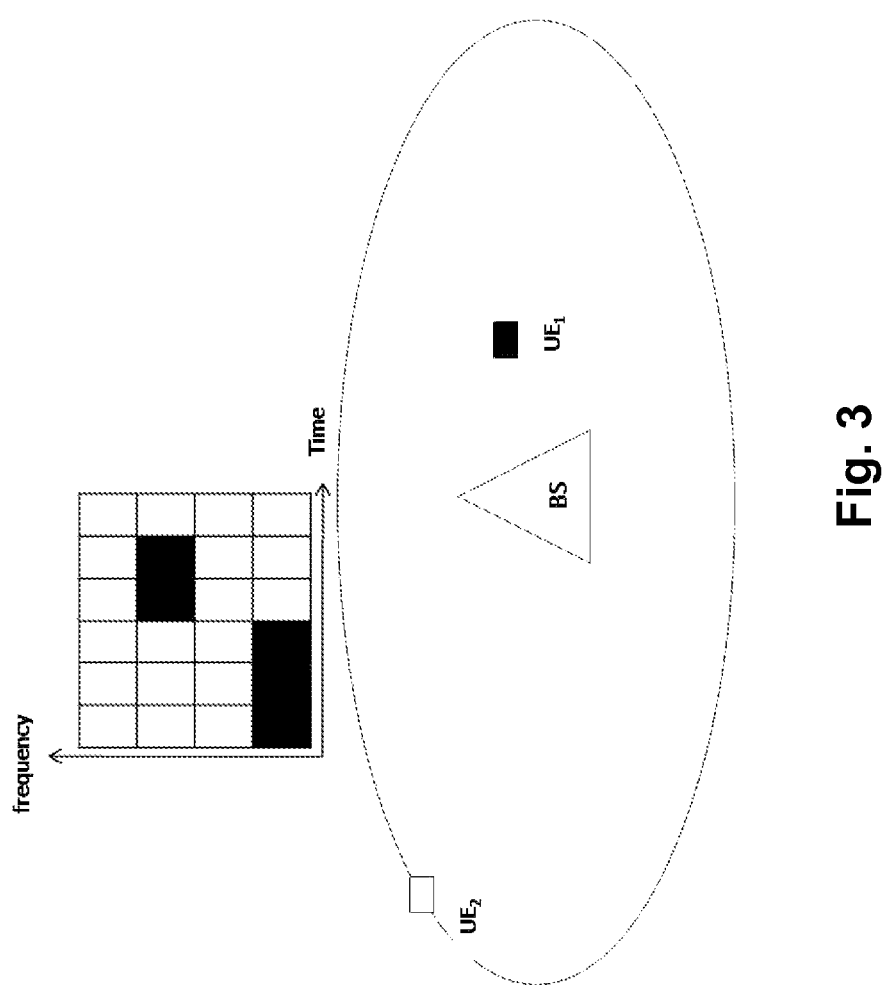

FIG. 3 is showing a wireless resource block allocation for wireless terminals. To properly reflect the congestion caused by a packet it should be taken into account how much spectral resources it requires for its transmission. This is different from how packets are marked in a fixed network, where the channel capacity is fixed and independent of which users' packets are sent. For example, if we consider a scenario with one user—User Equipment $UE_2$—at the cell border and one user—User Equipment $UE_1$—close to the base station, a transmission from the cell border will use a lower order MCS and therefore require more resource blocks to transfer the same number of bits as the user with the better channel, as illustrated in FIG. 3. Therefore, the probability of marking a packet should be higher when the channel conditions are bad.

Figure 4:
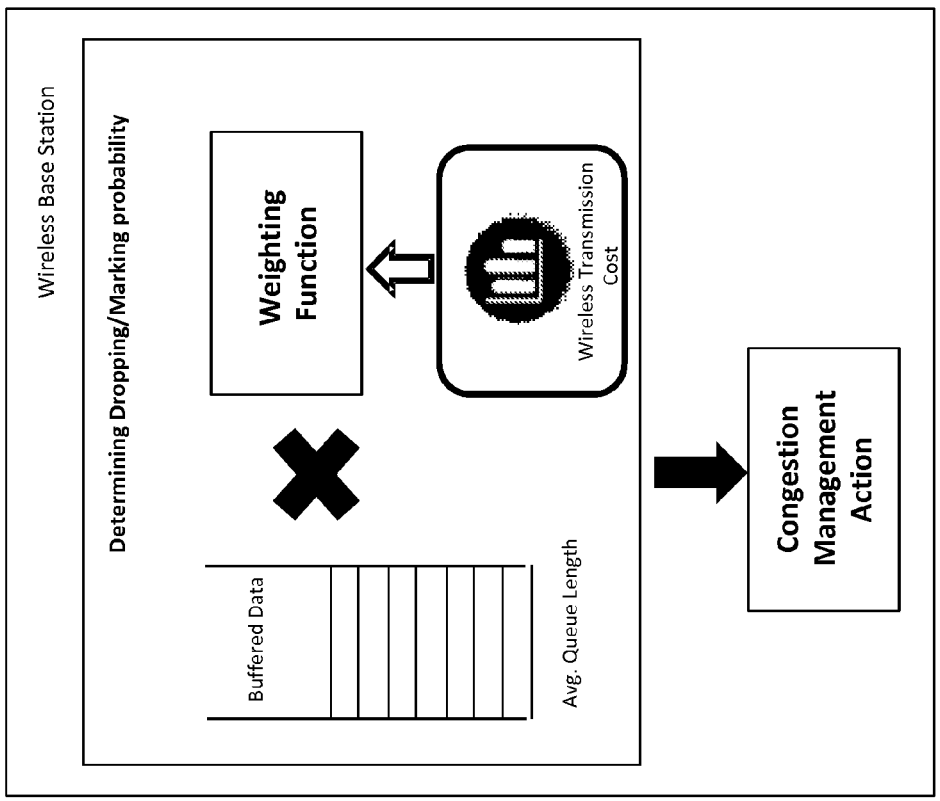

A conceptual overview of the general concept is depicted in FIG. 4, where a weighting function is taking wireless transmission cost—in some form—into account and the result is combined with the average queue length to generate a dropping/marking probability that is then used by a Congestion Management Action, e.g., ECN marking function. The queue length will normally be defined as the queue length of packets from all users in a traffic class, and can be located either in the base station—for the downlink—or be distributed in the different terminals (of the uplink). In the latter case the queue length can be measured through buffer status messages from the terminals.

MCS-Based Weighting

As one preferred embodiment, it is proposed a wireless weighting algorithm that works by multiplying the marking probability calculated from the average queue length with an index based on the current Modulation and Coding Scheme (MCS) of the user. In principle the index would be inversely proportional to the spectral efficiency of the MCS, i.e. how many bits that is transmitted in one resource block.

As a result, the marking rate of flows of users with better channel conditions would be on average lower compared to the marking rate of flows of users with lesser channel conditions as depicted in FIG. 5. Here, there are two groups of users: group 1 and group 2. For these groups, the wireless channel conditions will vary in different patterns. Each user downloads data using FTP (File Transfer Protocol) over TCP, and the file size is infinite so that the transmission is never limited by lack of data to be sent. The first group of users starts with bad channel conditions simulated by a low order modulation and coding scheme with BPSK 1/2 (Binary Phase-Shift Keying). After half the simulation time this group of users switch to a high order modulation and coding scheme with 64QAM 3/4 (Quadrature Amplitude Modulation). The other group of users starts with the high order MCS and switch to the low order when the first group switches to the high order MCS.

With the weighted marking the marking rate is significantly higher for the low MCS, which would also lead to a higher TCP throughput, assuming an ECN-enabled TCP implementation.

FIG. 6 shows how the relation between throughput and delay varies with the offered load for different queue management alternatives. It can be seen that the wireless weighted ECN leads to a higher throughput for a given delay than normal RED-ECN.

This is to some extent a trade-off between fairness and total throughput, where the wireless weighted ECN defines a fairness which is approximately proportional to the spectral efficiency of each user, while the standard RED ignores the wireless resources, and US 2009/0067335 A1 proposes using the share of resources for each user.

Transmission Power Based Weighting

Depending on channel loss or signal attenuation between the terminal and the base station, different transmission power levels can be used. E.g., with increasing distance of a terminal from the base station, both base station and terminal would use higher transmission power, which can lead to increased interference or power consumption.

For transmission power based weighting, a weighting function on a base station would map the currently used transmission power on the downlink to a congestion contribution for packets directed to the corresponding wireless terminal.

Considerations for the General Weighting Function Method

The congestion contribution is relevant on a packet-level—e.g., IP packets—, i.e., it applies to multiple octets. As a specific refinement, it is proposed that the weighting function should be designed so that the current channel characteristics reflect a relevant time period, which could be achieved by averaging the specific value representing radio-resource usage, e.g., MCS, over time.

Congestion Management Actions

The general method described here can be used for different concrete implementations of Active Queue Management.

As two concrete and preferred examples, this invention proposes to use the calculated weight as a factor for determining either
 the packet drop probability for a specific user by enhancing existing Random Early Detection mechanisms; or
 the marking probability for a specific user by enhancing existing Explicit Congestion Notification mechanisms.

The present invention is providing a concept to combine router queue length with a weighting function of per-user information on the wireless channel conditions for determining the congestion contribution, and to use this information for enhancing Active Queue Management algorithm in wireless base stations. Within the congestion weighting function an index based on the current MCS of the wireless station can be used. Further, the congestion weighting function can use current transmission power for sending from a base station to wireless station.

A general congestion weighting function can be optimized by averaging the specific value representing radio-resource usage over time.

It is proposed a specific congestion management action that multiplies an obtained weighting factor with the current average queue length in order to determine a packet drop probability for RED and/or a congestion marking probability for ECN.

The invention is providing a wireless resource-aware AQM and is considering a user's current wireless resource usage for congestion management.

The invention is enabling better usage of radio spectrum among mobile users, is enabling better network utilization in wireless networks and is enabling better quality of experience—lower delay and higher throughput in average—for best-effort traffic in LTE.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for operating a wireless network using a queue management function based on an average queue length in a network element, wherein:
 a result of a weighting function is combined or multiplied with the average queue length for determining a combined congestion contribution for use within the queue management function;
 the weighting function is taking into account per-user information on a wireless channel condition, and said weighting function is based on a current MCS (Modulation Coding Scheme; and
 the weighting function multiplies a marking or dropping probability calculated from the average queue length with an index that is based on the current MCS of a user, to generate said result.

2. The method according to claim 1, wherein the per-user information comprises resource usage and/or transmission cost for transmitting a certain information unit.

3. The method according to claim 1, wherein the weighting function maps channel resource usage to a factor for said combined congestion contribution.

4. The method according to claim 1, wherein the index is inversely proportional to the spectral efficiency of the current MCS.

5. The method according to claim 1, wherein the weighting function is further based on transmission power.

6. The method according to claim 1, wherein a currently used transmission power on a downlink is mapped to said combined congestion contribution for packets directed to a corresponding wireless terminal.

7. The method according to claim 1, wherein within the weighting function current channel characteristics reflect a relevant time period, which is achieved by averaging a specific value representing resource usage over time.

8. The method according to claim 1, wherein the combined congestion contribution is used for determining a packet drop probability for RED (Random Early Detection).

9. The method according to claim 1, wherein the combined congestion contribution is used for determining a congestion marking probability for ECN (Explicit Congestion Notification).

10. The method according to claim 1, wherein the method is performed within a wireless base station of the network.

11. A wireless network composed of network elements comprising:
a base station and user terminals, wherein:
a queue management function based on an average queue length in the network elements is used;
said base station is configured to combine or multiply a result of a weighting function with the average queue length for determining a combined congestion contribution for use within the queue management function,
the said weighting function takes into account per-user information on a wireless channel condition, and said weighting function is based on a current MCS (Modulation Coding Scheme); and
said weighting function multiplies a marking or dropping probability calculated from the average queue length with an index that is based on the current MCS of a user, to generate said result.

* * * * *